United States Patent
Peterson

[15] 3,661,197
[45] May 9, 1972

[54] COREBOX AND SEAL

[72] Inventor: Edwin F. Peterson, 119 Main Street, Neponset, Ill. 61345

[22] Filed: Feb. 9, 1970

[21] Appl. No.: 9,899

[52] U.S. Cl. ................................. 164/228, 49/489, 277/226
[51] Int. Cl. .......................................................... B22c 7/06
[58] Field of Search .......................... 164/228, 229, 230, 233; 49/486, 488, 489, 490, 493, 498, 475, 477, 485, 497, 499, 467–472; 277/215, 226, 235 B

[56] References Cited

UNITED STATES PATENTS

| | | | |
|---|---|---|---|
| 2,910,209 | 10/1959 | Nelson | 277/226 X |
| 3,007,600 | 11/1961 | Horner | 277/226 X |
| 3,074,129 | 1/1963 | Peterson | 164/228 |
| 3,102,309 | 9/1963 | Peterson | 164/228 |
| 3,140,517 | 7/1964 | Richter | 49/498 X |
| 3,491,825 | 1/1970 | Peterson | 164/228 |

FOREIGN PATENTS OR APPLICATIONS

| | | | |
|---|---|---|---|
| 855,671 | 2/1940 | France | 49/489 |
| 1,425,845 | 12/1965 | France | 49/472 |

*Primary Examiner*—J. Spencer Overholser
*Assistant Examiner*—John S. Brown
*Attorney*—Harold M. Knoth

[57] ABSTRACT

A seal for surrounding the cavity in a core box made up of a pair of mating members meeting at an interface in which a cavity-surrounding channel of greater than semicircular section is formed in but one of the members. The channel carries coextensively therewith a tubular elastomer seal of somewhat greater diameter than the channel so as to initially project from the channel in parabolic fashion, the parabolic portion being deformed into the channel as the two members are brought tightly together.

6 Claims, 5 Drawing Figures

PATENTED MAY 9 1972 3,661,197
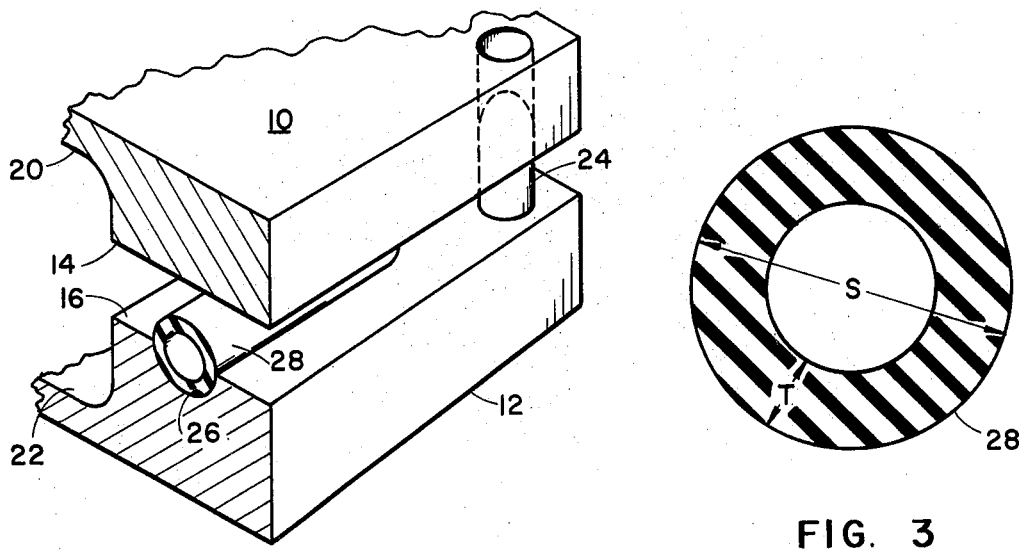
FIG. 1
FIG. 3
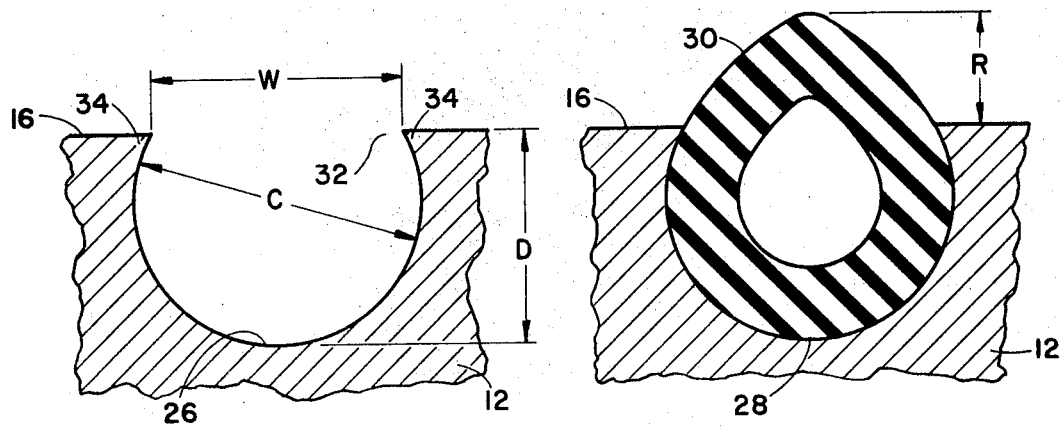
FIG. 2
FIG. 4
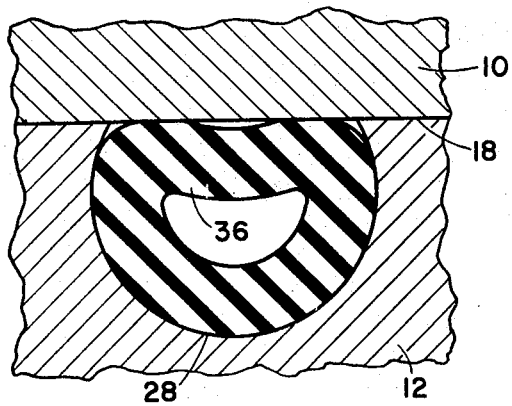
FIG. 5
INVENTOR.
E. F. PETERSON

COREBOX AND SEAL

BACKGROUND OF THE INVENTION

As is known from such prior art as the disclosures and practices following the U. S. patents to Peterson, U.S. Pat. Nos. 3,074,129 and 3,102,309, for example, the problems in sealing a core box are many and various, primarily because of demanding seal requirements due to high blowing pressures, the abrasive action of the core sand, attrition of seals by detergents, solvents etc. used in cleaning the box, the possibility of mechanical damage to the seal during use, handling and storage of the boxes, etc. In some prior instances, attempts were made to bond the seal to the face of one member and to provide the other member with a seal-receiving channel. It was found, however, that known adhesives are expensive, vulnerable to oils and solvents; the seal required an abundance of care in assembly and all too frequently became detached. In another example, both members were provided with semicircular channels and each channel carried a generally semicircular seal, but here again adhesive was relied upon to hold the seals in place. In some cases, attempts were made to mold the seals in situ, but this was costly and prevented easy repair and replacement.

SUMMARY OF THE INVENTION

The corebox structure and seal means afforded by the present invention features economy, adaptation to high pressures, conformity to corebox-face irregularities, easy repair and replacement, mechanical retention of the seal in its channel; i.e., without adhesives, adequate "reach"; i.e., projection initially from the mouth of the channel to establish proper contact with the opposite corebox member, and ability to deform partly into the channel as the members are compressed together, wherein the seal actually improves its seal relation to the "smooth" member (without the channel) and at the same time improves its seal and retention relation to the channeled member.

Fundamentally, these features are achieved by providing in one member an appropriately configured channel; i.e., to conform to and follow not only the shape of the cavity but also designed departures of the interface from a single plane. See, for example, the application of Peterson et al., Ser. No. 698,823, now U. S. Pat. No. 3,491,825. The channel has a cross section of somewhat greater than a semicircle (major segment of a circle) and thus presents to the opposing member a slot narrower than the basic diameter of the channel. The seal is tubular and of circular cross section and has a diameter somewhat greater than the basic diameter of the channel, and, since the seal is of any suitable elastomer, it is resilient, deformable and capable of regaining its initial shape, and thus capable of being readily inserted in and retained by the channel because of the forces developed from forcing the seal through the channel slot or mouth. Because the seal is "oversize" as respects the channel, the portion that projects through the channel slot assumes a generally parabolic shape, thus projecting farther from the channel mouth than would a seal having the same diameter as the channel. Such latter seal would project only as the minor segment of its own circle. Thus the oversize seal has a greater "reach" than a common-diameter seal.

DESCRIPTION OF THE DRAWINGS

FIG. 1 is a fragmentary perspective view illustrating complementary corebox members just prior to closing and sealing.

FIG. 2 is an enlarged fragmentary section of the lower core box member per se, drawn to a considerably enlarged scale.

FIG. 3 is a sectional view of the seal, drawn to the scale of FIG. 1.

FIG. 4, likewise on the same scale, illustrates the seal installed in its channel.

FIG. 5, on a like scale, illustrates the condition of the seal when the corebox is closed.

DESCRIPTION OF A PREFERRED EMBODIMENT

The core box shown in FIG. 1 is, except to the extent modified by the present invention, typical of known coreboxes, having a pair of members 10 and 12 that respectively have confronting faces 14 and 16 meeting at a parting "plane" or interface 18 (FIG. 5). The members respectively have cooperative cavity portions 20 and 22 which, when the box is closed, afford a cavity for the core. Opening and closing of the box is controlled by a plurality of dowels and bores, one set of which appears in FIG. 1 at 24. The corebox conventionally has an inlet, not shown, through which the core sand is "shot" to fill the cavity 20–22. Surrounding the cavity is an elongated seal-receiving channel 26. This channel has a cross section somewhat greater than a semicircle and this section is uniform through the length of the channel as it conforms to the shape of the core box cavity. Further, the channel is formed in only one member, here the lower member 12, thus eliminating the machining necessary to form a second channel in the member 10. The dimensional characteristics of the channel will be covered below.

A tubular seal 28 is received in the channel 26 and is coextensive therewith, its ends being suitably joined in any well known manner. The seal is made of any suitable elastomeric material e.g., Buna-N, polyurethane, etc., and has a circular cross section of somewhat larger diameter than the basic diameter of the channel 26.

For example, it has been found that a channel having a diameter C of, say, five-sixteenth inch (0.3125) and exceeding a semicircle by such amount that the channel depth D is 60 to 80 percent of C. This relation of dimensions provides high strength retention for a seal having a diameter S exceeding C by between 5 and 20 percent. Where the wall thickness T of the seal is about 25 percent of S, the seal can be assembled without difficulty into the channel 26. The resulting projection (portion 30) is of parabolic shape (FIG. 4). The relation of channel diameter C to channel depth D affects the width W of the channel slot or mouth 32 (FIG. 2), and the smaller the width W, the greater the "overhangs" 34 along the parallel edges of the slot and thus the greater the retention factor as respects the seal 28. It will be recognized that an extremely small dimension W will adversely affect the ease of installation of the seal unless dimension T is correspondingly reduced.

These dimensions have to be "balanced" to attain adequate retention, relative ease of installation and adequate reach R (FIG. 4). In one example, the force required to remove the seal was 5 lb. 6 oz. per lineal inch when channel diameter C is 0.3125 inch, a channel depth D of 0.2812, a width W of 0.188, a seal diameter S of 0.3225, and a seal wall thickness T of 0.0781 giving a reach R of 0.06325, whereas, when C and S are both 0.3125 in the same situation, the reach is only 0.03125. A somewhat surprising result is that in an improved example where the outside diameter of the seal S was increased by another 0.010 inch (to 0.3325), the reach was increased by a further amount of 0.032 inch (to 0.09525), a continuing factor of about 3; that is, S was 0.3325 and the reach R became 0.34525 inch.

Thus, it has been established that the channel depth D can range between 60 to 80 percent of channel diameter C, with an optimum in about the middle of that range. Seal diameters can exceed channel diameter C in the range of 5 to as much as 20 percent, with optimum results at 10 to 15 percent. Seal wall thickness T can range between 12 and 30 percent of seal diameter, the optimum being on the order of 25 percent. Within these ranges, the "reach" R will, of course, vary, and it is important to correlate reach with compressibility of the seal when the core box is closed (see 36, FIG. 5). Where the reach is too high and the resistance of the seal to deformability is likewise too high (e.g., thickness T too great), the box may be prevented from closing completely. If the reach is too low, the seal may not reach the mating surface of the other half of the box and grains of sand will be forcibly ejected through these open areas with the result that damage to the mating box face will necessitate costly repairs, or if the box is not repaired and the leakage persists, the sand blasting and wire drawing effect can render the core box equipment virtually irreparable.

Because of the present invention, it is economically feasible to provide seal structure that eliminates many of the problems and provides a seal that may be replaced or repaired while the corebox is still mounted in the core blower, thus eliminating the many and varied problems encountered in the prior art.

I claim:

1. A core box structure and seal means therefor including a pair of core box members respectively having confronting faces meeting at a parting plane, one of said members having therein an elongated channel of C-shaped cross section and opening at said one member face as an elongated slot, and an elongated tubular seal of elastomer material and of circular cross section received in the channel so that a segment of the seal projects initially through the slot to be engaged and compressed by the face of the opposing member, characterized in that the cross section of the channel of a circle wherein the depth of the channel as measured from said one member face is in the order of between 60 and 80 percent of the channel diameter, and the diameter of the seal exceeds that of the channel by between 5 and 20 percent of the latter diameter so that the segment of the seal that projects through the slot initially assumes and reassumes a parabolic shape before and after compression and release by said opposing member.

2. The invention defined in claim 1, further characterized in that the thickness of the seal is uniform and is in the range of 15 to 30 percent of the seal diameter.

3. A core box structure and seal means therefor including a pair of core box members respectively having confronting faces meeting at a parting plane, one of said members having therein an elongated channel of C-shaped cross section and opening at said one member face as an elongated slot, and an elongated tubular seal of elastomer material and of circular cross section received in the channel so that a segment of the seal projects initially through the slot to be engaged and compressed by the face of the opposing member, characterized in that the cross section of the channel of a circle wherein the depth of the channel as measured from said one member face is in the order of between 60 and 80 percent of the channel diameter, and the diameter of the seal exceeds that of the channel by between 10 and 15 percent of the latter diameter so that the segment of the seal that projects through the slot initially assumes and reassumes a parabolic shape before and after compression and release by said opposing member.

4. The invention defined in claim 3, further characterized in that the thickness of the seal is uniform and is in the range of 15 to 25 percent of the seal diameter.

5. A core box structure and seal means therefor including a pair of core box members respectively having confronting faces meeting at a parting plane, one of said members having therein an elongated channel of C-shaped cross section and opening at said one member face as an elongated slot, and an elongated tubular seal of elastomer material and of circular cross section received in the channel so that a segment of the seal projects initially through the slot to be engaged and compressed by the face of the opposing member, characterized in that the cross section of the channel of a circle wherein the depth of the channel as measured from said one member face is in the order of 60 percent of the channel diameter, and the diameter of the seal exceeds that of the channel by about 15 percent of the latter diameter so that the segment of the seal that projects through the slot initially assumes and reassumes a parabolic shape before and after compression and release by said opposing member.

6. A core box structure and seal means therefor including a pair of core box members respectively having confronting faces meeting at a parting plane, one of said members having therein an elongated channel of C-shaped cross section and opening at said one member face as an elongated slot, and an elongated tubular seal of elastomer material and of circular cross section received in the channel so that a segment of the seal projects initially through the slot to be engaged and compressed by the face of the opposing member, characterized in that the cross section of the channel of a circle wherein the depth of the channel as measured from said one member face is in the order of 80 percent of the channel diameter, and the diameter of the seal exceeds that of the channel by about 10 percent of the latter diameter so that the segment of the seal that projects through the slot initially assumes and reassumes a parabolic shape before and after compression and release by said opposing member.

* * * * *